Dec. 13, 1949     W. G. PETERS     2,490,881
STROKE ADJUSTING MECHANISM
Filed Jan. 5, 1949     2 Sheets-Sheet 1
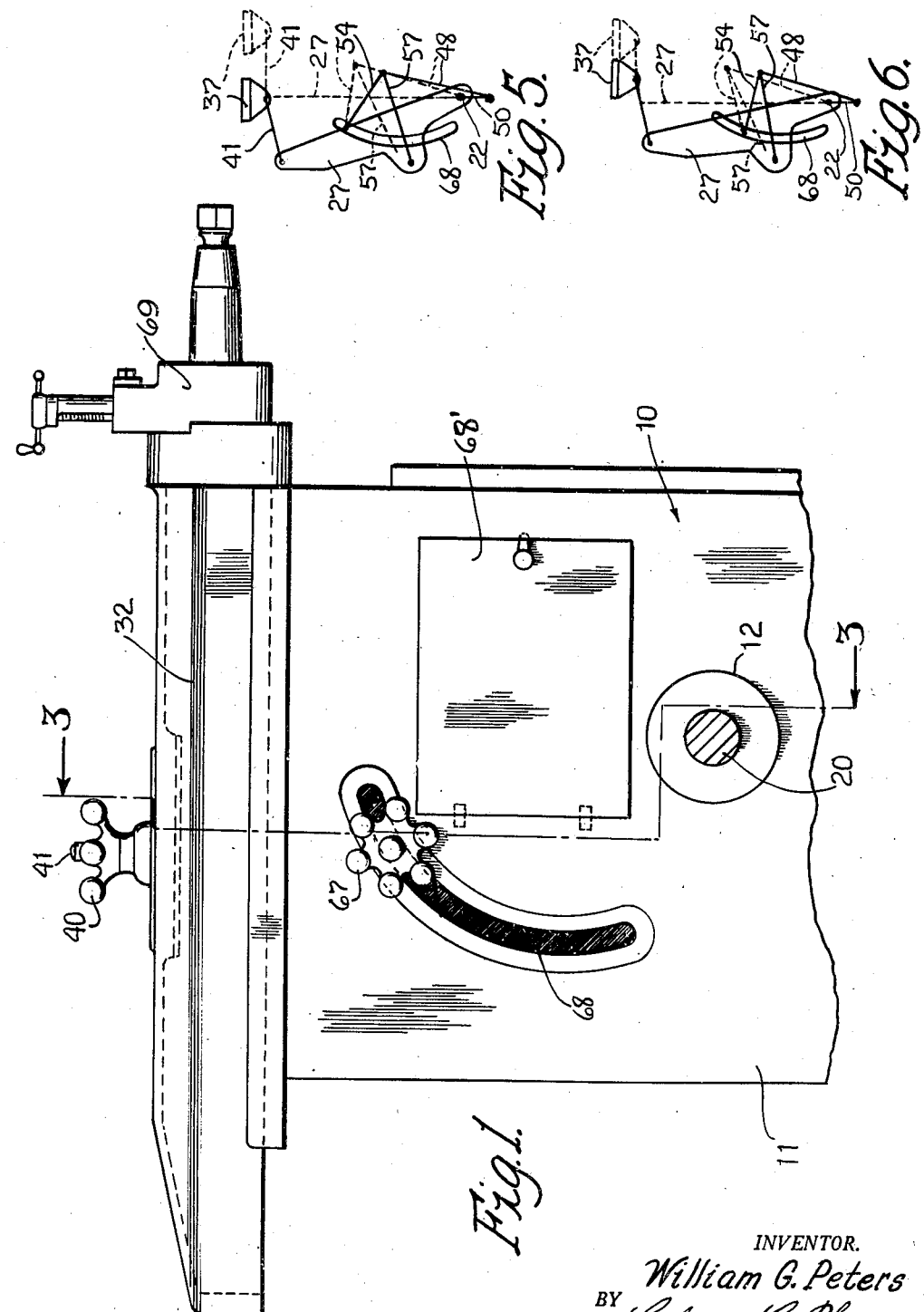
INVENTOR.
William G. Peters
BY Clarence E. Thrudy
His Attorney.

Dec. 13, 1949  W. G. PETERS  2,490,881
STROKE ADJUSTING MECHANISM
Filed Jan. 5, 1949  2 Sheets-Sheet 2
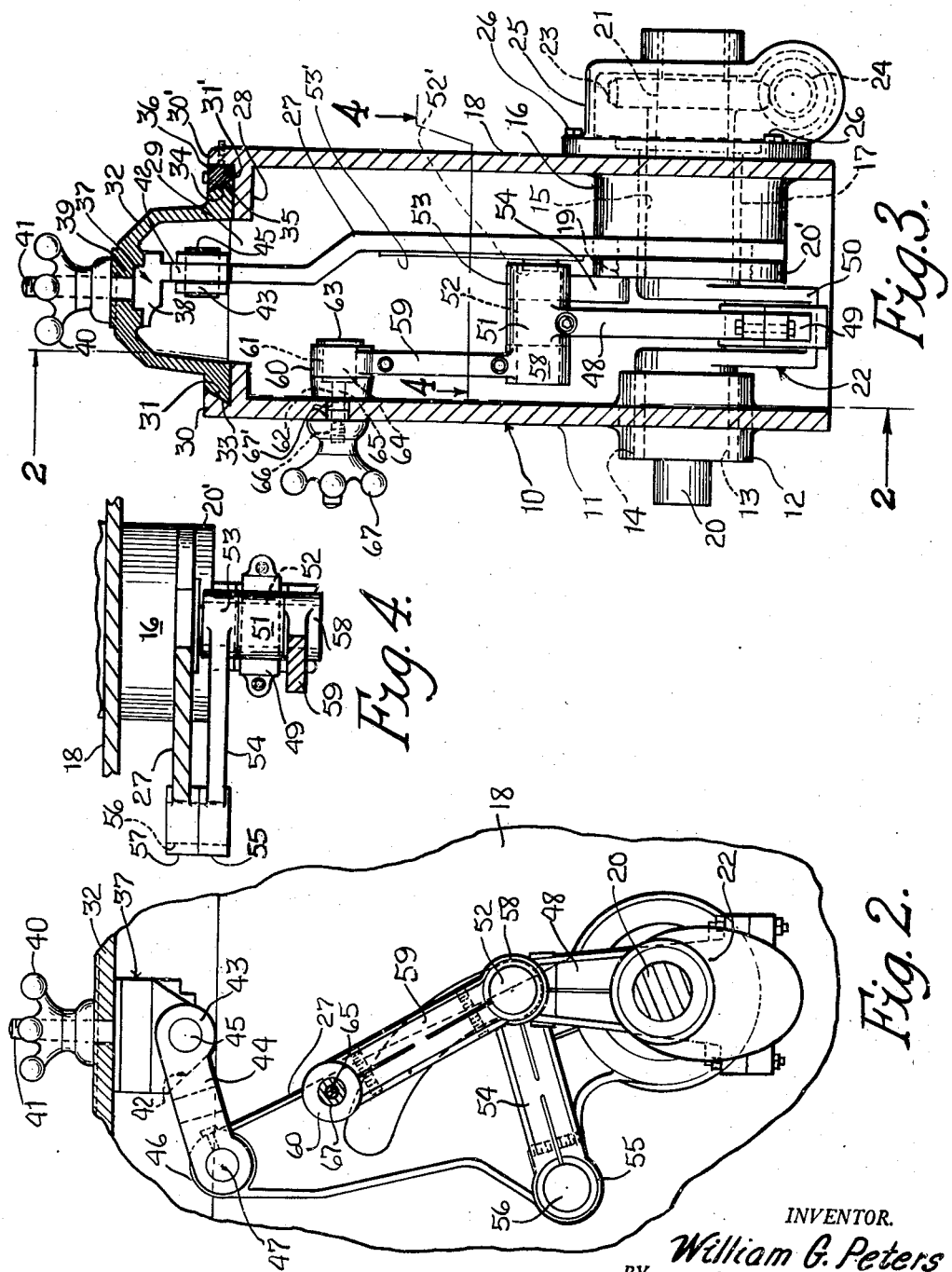
INVENTOR.
William G. Peters
BY Clarence E. Threedy
His Attorney.

Patented Dec. 13, 1949

2,490,881

UNITED STATES PATENT OFFICE 2,490,881

STROKE-ADJUSTING MECHANISM

William G. Peters, Oak Park, Ill.

Application January 5, 1949, Serial No. 69,395

4 Claims. (Cl. 74—40)

This invention relates to certain new and useful improvements in stroke-adjusting mechanism especially useful for use in connection with adjusting the stroke of a slide or ram of a shaping or planing machine.

As such, the invention has for its principal object the provision of an improved construction of this character which facilitates adjusting the stroke of the ram without stopping the operation of the machine and in a manner which will assure the maximum safety to the operator.

Another object of the invention is the provision of mechanism which is hereinafter described, which will result in a faster, smoother, and more efficient operation of the shaper or planer.

Yet another object of the invention is to provide a stroke-adjusting mechanism which comprises relatively few parts, with the result that the same may be manufactured at an economical cost.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentary side elevational view of a machine having incorporated therein my invention;

Fig. 2 is a fragmentary sectional detail view taken substantially on line 2—2 of Fig. 3;

Fig. 3 is a sectional detail view taken substantially on line 3—3 of Fig. 1;

Fig. 4 is a fragmentary sectional detail view taken substantially on line 4—4 of Fig. 2;

Figs. 5 and 6 are diagrams exhibiting the result of the stroke-adjusting mechanism embodying my invention.

The several salient objects of my invention are accomplished by the preferred form of construction shown in the accompanying drawings and in which 10 indicates a housing or enclosure.

One wall 11 of this housing provides a bearing 12 having a bore 13 within which is arranged a bushing 14. This bore 13 is in alignment with a bore 15 formed in a bearing 16 and having arranged in the bore 15 a bushing 17. This bearing 16 may be formed as an integral part of the opposite wall 18. The bearing is provided with a reduced end portion 19 on which is threaded a retaining collar 20'.

Journalled in the bushings 14 and 17 are the end portions 20 and 21 of a crank shaft 22. Arranged on the end portion 21 of the crank shaft is a pinion 23 meshing with a driven worm gear 24, through the medium of which the crank shaft 22 is rotated. In the present instance a suitable enclosure 25 is provided for the pinion 23 and gear 24, and this housing may be removably attached to the wall 18 as by means of bolts 26.

Mounted for oscillation on the reduced portion 19 of the bearing 16 is a rocker arm 27, the rocker arm 27 being retained on this reduced portion 19 by the collar 20'.

The top wall 28 of the housing 10 provides an elongated slot 29. The edge portions 30 of the wall 11 provide an undercut groove 31, while the edge portion 30' of the wall 18 provides a groove 31' substantially rectangular in cross section.

A slide or ram 32 is provided with tapered base edges 33 and 34, the base edge 33 being shaped to correspond to the groove 31. The base edge 34 provides a tapered wall 35 spaced from the adjacent vertical wall of the groove 31'. In this space between the tapered wall 35 and the vertical wall of the groove 31', is a retainer bar 36 secured to the wall 18 in any approved manner.

By this arrangement the slide or ram is retained for reciprocatory movement with respect to the housing 10 over the elongated slot 29.

A clamp is indicated at 37. This clamp has a base portion 38 which is adapted to be drawn up tightly against the adjacent wall 39 of the ram by means of a nut 40 threaded upon a threaded shank 41 formed as an integral part of the clamp 37. This arrangement is such that by tightening the nut 40 upon the threaded shank 41, the clamp 37 may be secured in a predetermined position with respect to the ram 32. This clamp 37 provides a depending lug 42 which fits into a bifurcated end portion 43 of a link 44 and is connected thereto by a pin 45. The opposite bifurcated end portion of the link 44 receives the end portion 46 of the rocker arm 27 and is connected thereto by a stud shaft 47, thus completing connection between the rocker arm 27 and the slide or ram 32.

A connecting rod is indicated at 48 and has one end portion 49 connected to the crank 50 of the crank shaft 22. The opposite end portion of this connecting rod 48 provides a bearing 51. Connected at one side of this bearing 51 by means of a connecting pin 52 is a bearing 53 of a link 54. This link 54 at its opposite end portion provides a bearing 55 which is connected to the rocker arm 27 by a stud shaft 56 projected into a bearing 57 provided by the rocker arm 27.

Connected at the opposite side of the bearing 51 by means of the pin 52 is a bearing 58 of a connecting link 59. This link 59 provides a bearing 60 having aligned bores 61 and 62 formed therein and of different diameters, the bore 61 being of the larger diameter.

A bolt 63 has a body portion 64 mounted in the bore 61 and a reduced portion 65 which provides a threaded shank 66. This threaded shank 66 projects through the bore 62 and has threaded thereon a nut 67. This nut and the bearing 60 provide boss portions 67' which project into an arcuate slot 68 formed in the wall 11 of the housing 10.

By adjusting the nut 67 upon the shank 66, the bolt 63 may be adjusted in a predetermined position with respect to the slot 68 whereby to change the fulcrum for the link 59.

The slide or ram 32 is of a standard construction and carries the tool chuck 69 which likewise is of a well-known standard construction.

By adjusting the position of the bolt 63 toward the lower portion of the arcuate slot 68, the stroke of the rocker arm 27 will be shortened as shown in Fig. 6. By adjusting the bolt 63 toward the upper portion of the arcuate slot 68, the stroke of the rocker arm 27 will be lengthened as shown in Fig. 5. This adjustment may be made during the operation of the machine by the simple operation of moving the bolt 63 within the slot 68 through the manipulation of the nut 67 after the same has been loosened.

By varying the position of the bolt 63 within the slot 68, the arc through which the connecting pin 52 travels will likewise be varied and the relative change of this position of the arc traveled by the connecting pin 52 determines the length of the stroke of the rocker arm 27.

A suitable door 68' is provided in the wall 11 whereby access may be had to the interior of the housing.

From the foregoing description, it will be apparent that I have provided a stroke-adjusting mechanism which is simple in operation, easily adjusted, and one which will be highly efficient in use.

To complete the invention I have provided on the connecting pin 52 at one end thereof an insert 52' in the form of material capable of resisting wear. This insert 52' is adapted to bear against a relatively flat track 53' formed on one side of the rocker arm 27.

This insert 52' in its bearing engagement on the track 53' cooperates with the link 59 and the pin 63 to resist lateral vibration of the rocker arm, which vibration otherwise should be transmitted to the slide or ram 32 and in turn transmitted to the tool stock, resulting in a defective shaved or planed surface on the work. By thus resisting the vibration of the rocker arm 27, the surface of the work operated upon will be substantially smooth, free from any imprints of the tool.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A stroke-adjusting mechanism for a machine having a crank shaft and a ram supported by a housing for reciprocatory movement, a bearing on said housing for said crank shaft, a rocker arm supported by said bearing, link connection between the rocker arm and the ram, a connecting rod carried by the crank shaft, link connection between the connecting rod and the rocker arm, a link having connection with the connecting rod, means providing a fulcrum for one end of said link, and means for adjustably connecting said last-named means to a wall of the housing.

2. A stroke-adjusting mechanism for a machine having a crank shaft and a ram supported by a housing for reciprocatory movement, a bearing on said housing for said crank shaft, a rocker arm supported by said bearing, link connection between the rocker arm and the ram, a connecting rod carried by the crank shaft, link connection between the connecting rod and the rocker arm, a link having connection with the connecting rod, means providing a fulcrum for one end of said link, means for adjustably connecting said last-named means to a wall of the housing, said last-named means including a bolt having connection with the connecting link and providing a threaded shank projecting through an arcuate slot in a wall of the housing and having a nut threaded on said shank to fix said bolt in a selected position with respect to said slot.

3. Stroke-adjusting mechanism for a machine having a housing, a reciprocating ram carried by the housing, bearings provided by adjacent walls of the housing, and a crank shaft journaled in said bearings, comprising a rocker arm carried by one of said bearings and having link connection with the ram, a connecting rod having connection with the crank shaft, a link connection between the connecting rod and the rocker arm, and means cooperating with a wall of the housing and providing an adjustable fulcrum for said link member.

4. Stroke-adjusting mechanism for a machine having a housing, a reciprocating ram carried by the housing, bearings provided by adjacent walls of the housing, and a crank shaft journaled in said bearings, comprising a rocker arm carried by one of said bearings and having link connection with the ram, a connecting rod having connection with the crank shaft, a link connection between the connecting rod and the rocker arm, means cooperating with a wall of the housing and providing an adjustable fulcrum for said link member, said last-named means comprising an arcuate slot formed in said wall of the housing, a bolt carried by said link member and projecting through said slot, and a nut member threaded on said bolt for securing said bolt in a selected position with respect to said slot and for manipulating said bolt for movement relative to said slot.

WILLIAM G. PETERS.

REFERENCES CITED

The following references are of record in the file of this patent:

UNITED STATES PATENTS

| Number | Name | Date |
| --- | --- | --- |
| 285,083 | Stevens | Sept. 18, 1883 |
| 529,339 | Stone | Nov. 13, 1894 |
| 740,027 | Leve | Sept. 29, 1903 |
| 2,108,311 | Harris | Feb. 15, 1938 |